United States Patent [19]

Davis

[11] Patent Number: 4,894,665

[45] Date of Patent: Jan. 16, 1990

[54] METHOD OF GENERATING AN EXPANDED COLOR SET OF A LOW RESOLUTION COLOR PRINTER

[75] Inventor: Randall L. Davis, Phoenix, Ariz.

[73] Assignee: Honeywell Inc., Minneapolis, Minn.

[21] Appl. No.: 340,839

[22] Filed: Apr. 20, 1989

[51] Int. Cl.$^4$ .......................... G01D 9/00; G03F 3/08
[52] U.S. Cl. ...................................... 346/1.1; 346/46; 358/75; 358/79; 358/80; 358/296
[58] Field of Search ..................... 346/1.1, 46; 358/75, 358/79, 80, 296

[56] References Cited

U.S. PATENT DOCUMENTS

4,682,216 7/1987 Sasani et al. ....................... 358/79

Primary Examiner—B. A. Reynolds
Assistant Examiner—Gerald E. Preston
Attorney, Agent, or Firm—A. A. Sapelli; D. Lenkszus; A. Medved

[57] ABSTRACT

In a low resolution color printer having a color set, a set of shaded colors is generated thereby expanding the color set of the printer. The method for generating the shaded colors determines if a critical line is to be printed. Then a check is made to determine if a shaded color is to be printed. If a pattern of a shaded color is to be printed, including a non-critical line, a first algorithm is used to generate a print buffer by interspersing a dark (quasi-black) colored pixel among the colored pixels, the blending effect resulting in a shaded color. If a critical line of a shaded color is to be printed, a second algorithm is utilized (to overcome a deficiency of the first algorithm) to insure an interspersing of the dark pixels with colored pixels. Otherwise, the pattern is printed in the designated color.

18 Claims, 6 Drawing Sheets

METHOD OF GENERATING AN EXPANDED COLOR SET OF A LOW RESOLUTION COLOR PRINTER

BACKGROUND OF THE INVENTION

This invention relates to a method for printing, and more particularly, to a method for printing an increased number of colors utilizing a color printer having a predetermined number of colors.

There currently exists various techniques for printing in a variety of colors from a predetermined set of colors. A color ink jet printer contains liquid ink of some predetermined colors, allowing the color ink jet printer to print in this predetermined set of colors. The color ink jet printer can print additional colors, i.e. expands the predetermined set of colors, by spraying a point (pixel) on the paper with a predetermined combination of the set of colored ink such that the colors achieve a blending effect resulting in a new color, i.e. a color in addition to the predetermined set of colors. There also exists color thermal printers which are high resolution printers, having both an external resolution and an internal resolution, and allow color mixing as the ink jet printers. The external resolution allows a pixel to be addressed by attached external equipment (i.e., a processor or computer system). When the processor desires to use the printer, the processor sends command information to the printer to print a specified pixel in either a "pure" color or a "non-pure" color (non-pure is used here in the sense that the thermal printer has a predetermined set of solid ink cartridges which allows printing in the set of "pure" colors, and "non-pure" is a predetermined combination of the "pure" colors). The pixel of the color thermal printer has an internal resolution (i.e., high resolution) which is utilized by the printer. Thus, if the thermal printer has a 2 by 2 internal resolution, there are four "sub-pixels" which are not addressable by the external equipment. If the color thermal printer is commanded to print a non-pure color, the internal logic of the printer causes each of the 4 "sub-pixels" to be printed with a predetermined pure color such that the blending effect of the human eye will be observed as the commanded non-pure color. In this manner, high resolution color printers achieve an expansion of the color set of the high resolution printer.

The present invention provides a method which results in expanding the set of colors which can be printed on a low resolution printer.

SUMMARY OF THE INVENTION

Therefore, there is provided by the present invention, a method for increasing the number of available colors which may be utilized by a printer having a relatively low, predetermined number of available colors. In a low resolution color printer, printing is achieved by causing selected pixels to be printed to generate the selected pattern. The printer has a predetermined number of primary colors which makes up the color set. The printer utilizes a method for generating shaded primary colors thereby expanding the color set of the printer. The method determines if a critical line is to be printed, and also determines if the shaded color is to be printed. If a shaded pattern (i.e., any pattern but a critical line) is to be printed utilizing one of the primary colors, a print buffer is generated in accordance with a first algorithm. If a critical line is to be printed having a shaded primary color, a print buffer is generated in accordance with a second algorithm (because the first algorithm breaks down for the critical line). The second algorithm takes care of the case which is not handled by the first algorithm by causing a dark color (quasi black, generated by overstriking predetermined primary colors) to be interspersed with the primary color selected for printing. If a shaded color is not to be printed, a print buffer is generated using the designated primary color.

For printers having inks whose chemistry support overstriking such that additional colors can be generated, the additional colors being referred to as secondary colors, the printer color set is thereby made up of the primary and secondary colors. In this case, the method described above is also applicable to the primary and secondary colors.

Accordingly, it is an object of the present invention to provide a method for expanding the color set of a color printer.

It is another object of the present invention to provide a method for increasing the number of colors which may be printed by a color printer.

It is still another object of the present invention to provide a method for increasing the number of colors which can be printed by a color printer having a predetermined number of available colors.

It is yet another object of the present invention to provide a method for increasing the number of colors which can be printed from a color printer having a relatively low, predetermined number of available colors.

It is a further object of the present invention to provide a method for increasing the number of colors which can be printed by a low resolution color printer.

It is still a further object of the present invention to provide a method for generating an expanded color set using a low resolution color printer.

These and other objects of the present invention will become more apparent when taken in conjunction with the following description and attached drawings, wherein like characters indicate like parts, and which drawings form a part of the present invention.

BRIEF DESCRIPTION OF THE DRAWINGS

FIGS. 5A and 5B, which together comprise FIG. 5, shows a line J-K which is to be printed in a shaded color in accordance with the method of the present invention, the line to be being a "critical line";

DETAILED DESCRIPTION

The method of the present invention finds utility in a low resolution printer, such as a dot matrix printer. The dot matrix printer of the preferred embodiment has a ribbon having four (4) colors, cyan (blue), yellow, magenta (red), and black, thereby permitting color printing. The chemistry of the ink and paper is such that additional colors can be printed by overstriking colors. Thus, a green dot is generated by first printing the cyan dot and overstriking the same point (pixel) with a yellow dot, the overstriking causing a blending of the cyan and yellow colors. Additional colors can be generated by combining the primary colors (i.e., the colors of the ribbon excluding black). Yellow and magenta can be combined (blended) to yield orange, and cyan and magenta can be combined to give purple. These combinations (i.e., green, orange, purple ) of the primary colors are referred to herein as the secondary colors.

Thus far, there are three primary colors and three secondary colors. The method of the present invention permits these six colors to be shaded (i.e., darkened) by juxtaposing each of the six colors with black, doubling the number of colors which can be printed, the total colors which can be printed are cyan, dark cyan, green, dark green, . . . , or a total of twelve, [ plus black and gray (black +white) yielding a grand total of fourteen].

Figure 1:
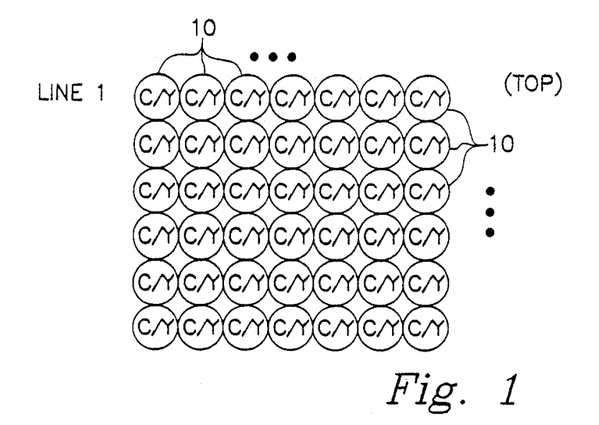
FIG. 1 shows a partial pattern of a printout by a low resolution dot matrix printer.

Referring to FIG. 1, there is shown a partial pattern of a printout by a dot matrix printer (not shown). Each pixel (dot) 10, is separately addressable by equipment external to the printer (not shown). If the pattern of FIG. 1 is to be printed in a green color (G), the print head of the printer travels across the paper from left to right along the top line (TOP) striking each pixels with the color cyan, denoted C. The print head then returns to the left margin (or prints from right to left), without a form feed, thereby printing line 1 again and printing each pixel with the color yellow, denoted Y. The blending which occurs results in a green pattern.

Figure 2:
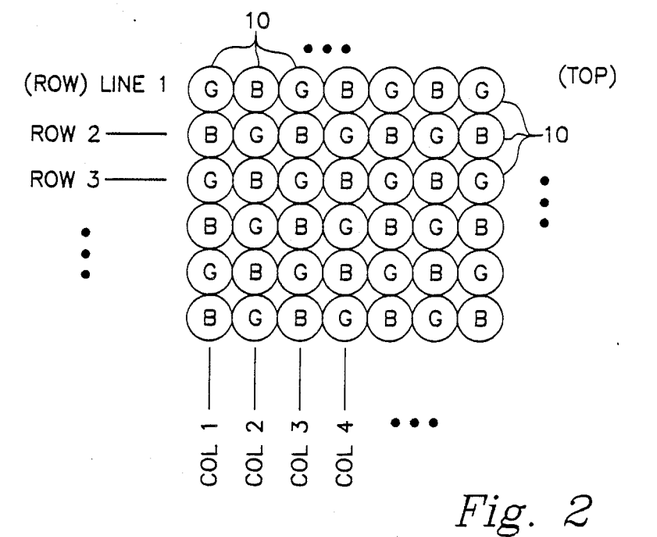
FIG. 2 shows a partial pattern of a printout by a low resolution dot matrix printer having a dark green color utilizing the method of the present invention.

If a dark green pattern is desired to be printed, the green pixels would be juxtaposed with black pixels. The human sight tends to cause the green and black pixels to blend into a new color, namely dark green. Referring to FIG. 2, a printing pattern to yield a dark green is shown. In this case, the print head makes three passes for each line (or row), printing the cyan colored pixels, the yellow colored pixels, and the black colored pixels according to the pattern shown in FIG. 2. The cyan-yellow pixels are denoted as the resulting color green (G). The black colored pixels are denoted as (B). By juxtaposing black pixels with either the primary or secondary colors, the shaded colors (or darkened colors) are obtained, i.e., dark cyan, dark yellow, dark magenta, dark green, dark orange, and dark purple. The pattern utilized in the preferred embodiment of the present invention in achieving the shaded colors has a characteristic that for each pixel whose sum of the row number and column number is even, the primary or secondary color is printed, and for each pixel whose sum of the row number and column number is odd, the black color is printed (referred to herein as algorithm A, ALG-A).

Figure 3:
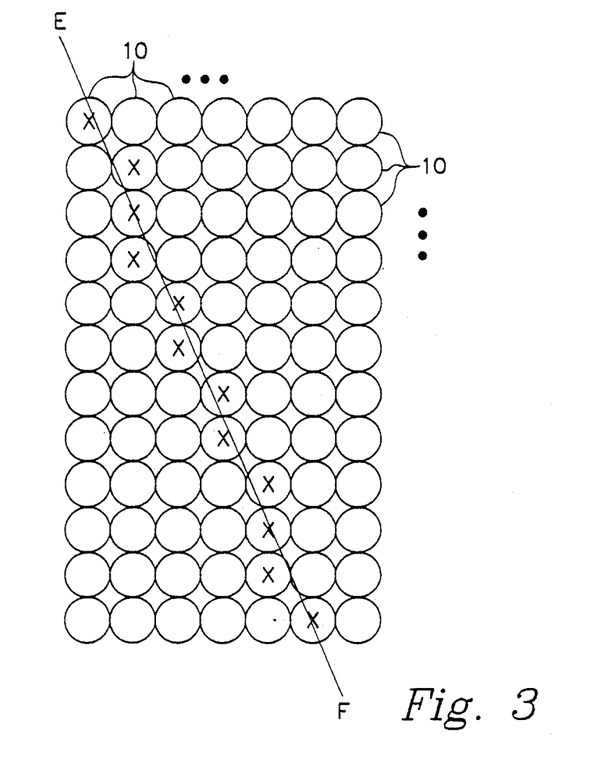
FIG. 3 shows a printout of a line by a low resolution dot matrix printer having a primary or secondary color.

Referring to FIG. 3, if a line E-F of a primary or secondary color is desired to be printed, the pixels 10, denoted X, are printed in the desired primary or secondary color. (X is magenta if the color to be printed is magenta, X is cyan/yellow (C/Y) if the color to be printed is green, . . . )

Figure 4:
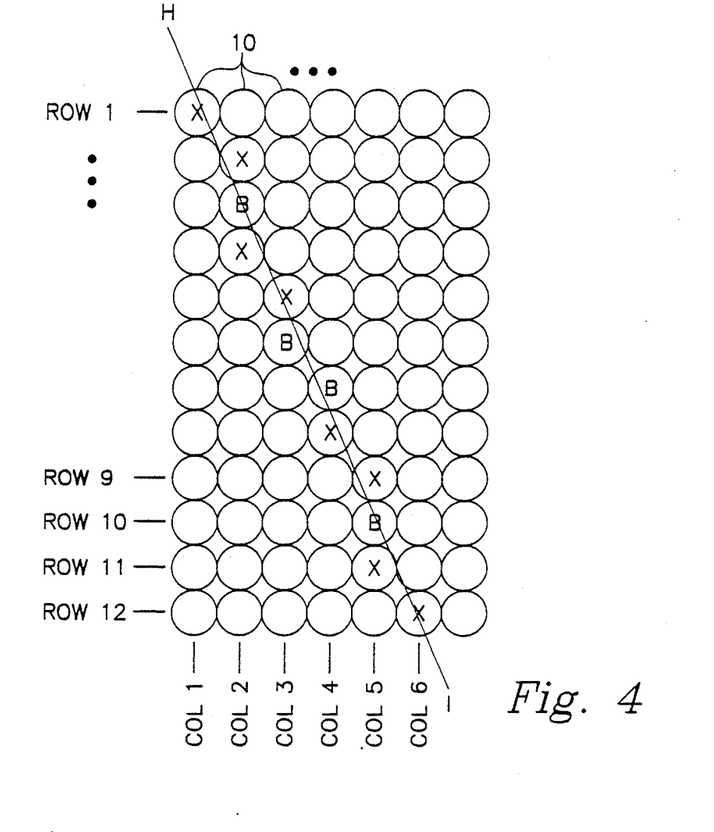
FIG. 4 shows a printout of the line of FIG. 3 in a shaded color.

Referring to FIG. 4, there is shown a line H-I (having the same slope as the line E-F of FIG. 3) printed in the shaded color, where X denotes the primary or secondary color and B denotes black (or the color black). It will be noted that each pixel printed to form the line H-I is printed in accordance with the pattern identified above, i.e., ALG-A. Thus, the pixel 10 printed in row 9, column 5 has a sum of 14, which is even, thereby printing the X denoted color. The pixel 10 printed in row 10, column 5, has a sum of 15, which is odd, thereby printing the (B) black color, . . . Although there are not alternative X and B colored pixels printed (which would be very difficult since the line H-I is made up of small segments), there are enough B colored pixels interspersed with the X colored pixels to cause the appearance of a shaded color.

Figure 5A:
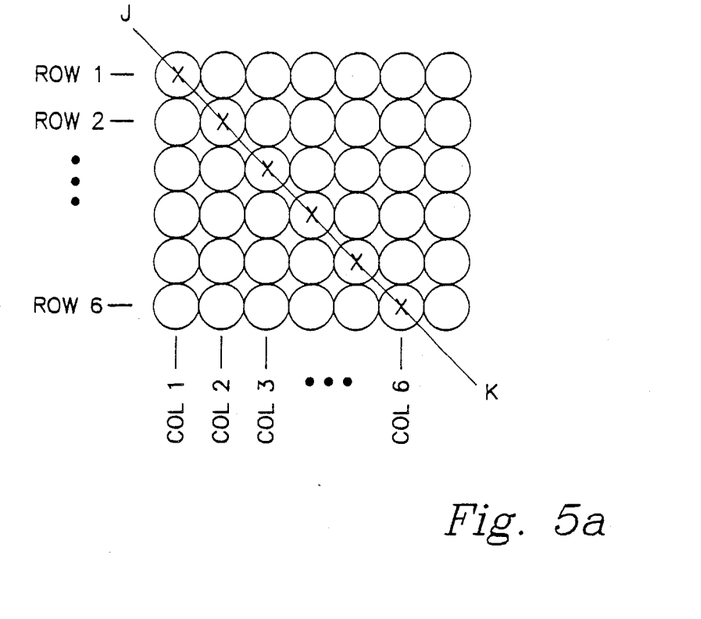
Figure 5B:
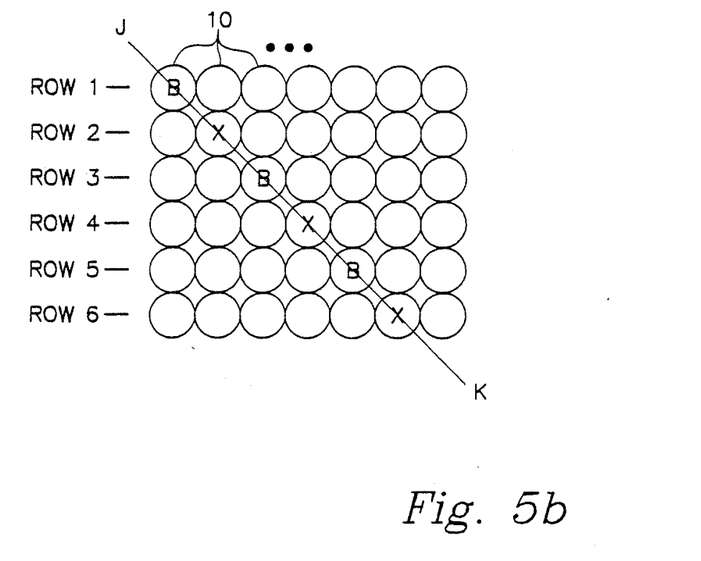

Referring to FIGS. 5A and 5B, which together comprise FIG. 5, there is shown a line J-K which is to be printed in a shaded color (primary or secondary). Utilizing the algorithm (ALG-A) discussed above, each pixel to be printed to form the line J-K will be printed in the primary or secondary color, denoted X, as shown in FIG. 5A. In this case (the line is a "critical line" which will be discussed below), a shaded colored line cannot be printed. Therefore, before the line is printed, a check must be made to determine if the pattern is a "critical-line". If the pattern to be printed is a "critical line", the algorithm must be modified (or another algorithm utilized). The algorithm of the preferred embodiment of the present invention (for a critical line) determines if the row is odd or even, and for even numbered rows (or columns) causes the primary or secondary color denoted X to be printed, and for odd numbered rows or columns causes the black color denoted B to be printed (referred to as algorithm B, ALG-B), as shown in FIG. 5B, thereby achieving the desired interspersing of X and B colored pixels to yield the shaded color X. (As discussed previously, high resolution printers do not exhibit this anomaly.)

In terms of an X-Y coordinate for the printout (where the column numbers correspond to points along the X-axis, and the row numbers correspond to points along the Y-axis), in the above example the "critical line" is a 45 degree line (with respect to the x-axis). If the size of the pixel changes, i.e., the X-dimension and Y-dimension of the pixel are different, the slope of the "critical line" will be a function of the Y dimension to the X dimension.

Figure 6:
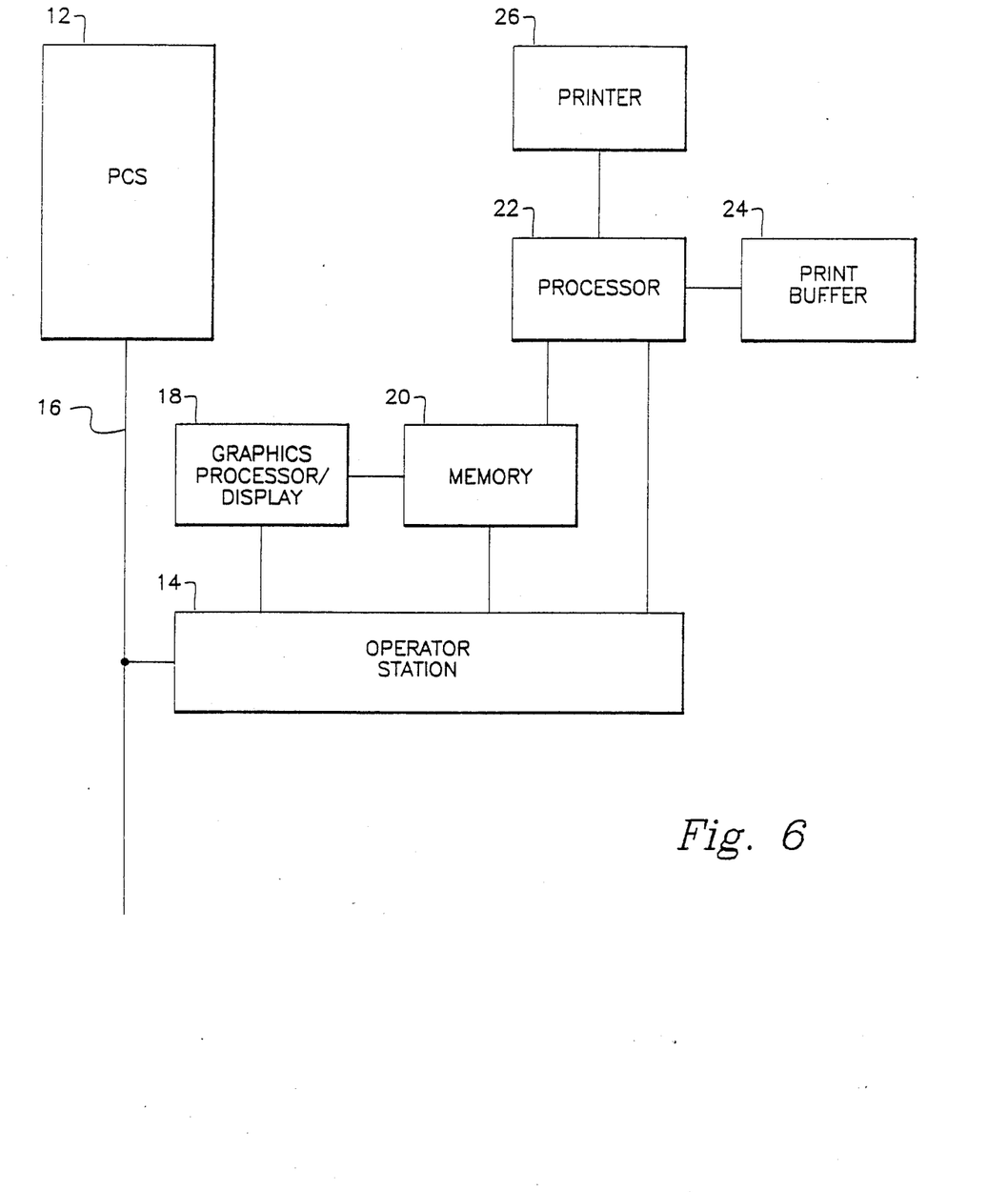
FIG. 6 shows some of the peripherals of a process control system which utilizes the method of the present invention.

Referring to FIG. 6, there is shown some of the peripherals of a process control system which utilizes the method of the present invention A process control system (PCS) 12 (such as that described in U.S. Pat. No. 4,07,256, assigned to the same assignee as the present application), includes an operator station 14 connected to a bus 16 of the PCS 12. The operator station is connected to a graphics processor/display unit 18 and has an associated memory 20. The memory 20 of the system is a 640×48 memory corresponding to the display screen size. A processor 22, which includes logic to implement the method of the present invention is connected to the operation station 14 and to memory 20. The processor 22 is in turn connected to a print buffer 24 and a low resolution printer 26, i.e., a dot matrix printer having colored ribbons as discussed above.

In the operation of the PCS 12, various operations, data (bar charts, curves, . . . ), status, . . . are displayed on the display 18, such that an operator stationed at the operator station 14 can monitor and control the operation of the process. If a hard copy of the display is desired, the operator commands the processor 22 to print the information displayed. The processor 22 extracts the information in memory 20 and generates the print buffer 24 in accordance with the command/control information received by the operator from the operator station 14. Since the display unit is capable of displaying information in a larger variety of colors than the low resolution printer 26, the expansion of the color set for the low resolution printer 26 is necessary in order to be compatible with the display 18. Thus, in a predetermined manner, the shaded colors are utilized by the processor 22 in generating the information in the print buffer 24. When the print buffer has all the information stored therein, the information is printed.

Figure 7:
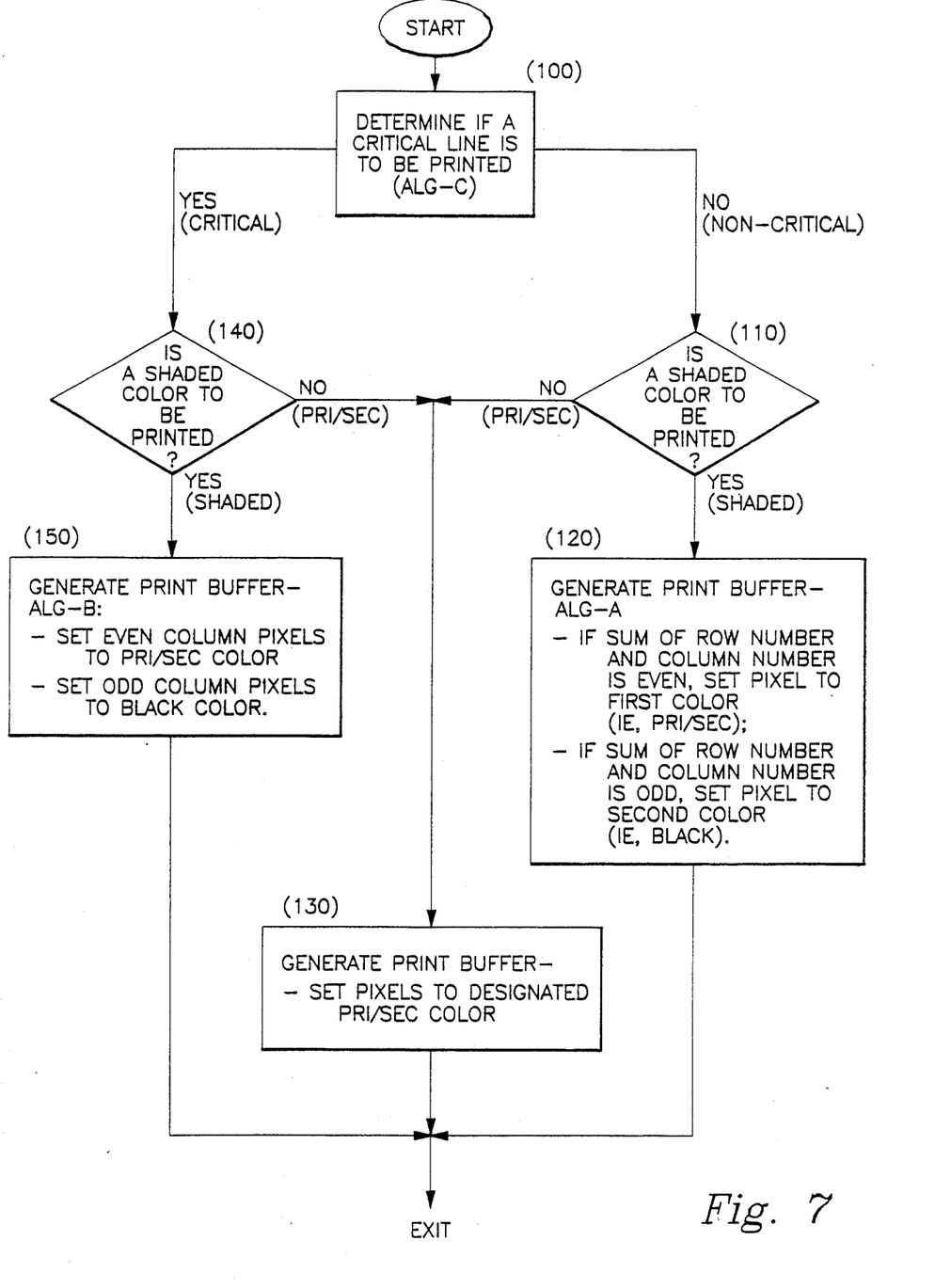
FIG. 7 shows a flow diagram of the process in which the algorithm is selected in order to generate the print buffer.

Referring to FIG. 7, there is shown a flow diagram of the process in which the algorithm is selected in order to generate the print buffer. The process determines if a critical line is to be printed (Block 100). If a critical line is not going to be printed, a check is made to determine if a shaded color or a non-shaded color (ie., primary or secondary color) is to be printed (Block 110). If a shaded color is to be printed, the print buffer is generated using algorithm A (ALG-A) (Block 120). If a non-shaded color is to be printed, the print buffer is generated, the pixels being set to the designated primary or secondary color (Block 130).

If it is determined that a critical line is to be printed as a result of the operation of Block 100, a check is made to determine if a shaded color or a non-shaded color (ie., primary or secondary color is to be printed (Block 140). If a shaded color is to be printed, the print buffer is generated using algorithm B (ALG-B) (Block 150). If a non-shaded color is to be printed, the print buffer is generated, the pixels to be printed set to the designated primary or secondary color (Block 130).

The determination that a critical line is to be printed is performed by algorithm C (ALG-C) of block 100. It can be readily seen that any given pixel has eight neighboring pixels (unless the pixel is on the outer edge of the pixel plane, in which case the pixel has fewer neighboring pixels). In order to determine which algorithm (ALG-A or ALG-B) is to be used on any given pixel, the horizontal and vertical neighbors are interrogated. If any horizontal or vertical neighbor is of the same color as the pixel in question, ALG-A is used. Otherwise, ALG-B is used. If the pixel is on the outer edge of the pixel plane, ALG-A is used. This algorithm (ALG-C) works because none of the pixels in a critical line will have horizontal or vertical neighbors of the same color.

It will be understood by those skilled in the art that the flow diagram of FIG. 7 can take various alternatives while still accomplishing the method of the present invention. Further, it will be understood by those skilled in the art that for those paper/ink combinations which do not support overstriking (to achieve the blending of primary colors to generate the secondary colors), the secondary colors can be generated by juxtaposing the primary colors, and the shaded colors can be generated by juxtaposing the primary or secondary colors with the black color. Further, it will be understood by those skilled in the art that, for printers not having a black color, a black (or nearly black) color can be generated. In the example discussed above, the red-blue combination (yielding purple) may be sufficiently dark to give the appearance of black (or quasi-black) for generating shaded colors.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

What is claimed is:

1. In a low resolution color printer which prints a pattern by printing selected pixels, said printer having a predetermined number of colors thereby making a color set of said printer, said printer also having a color black, a method of generating shaded colors thereby expanding the color set of said printer, said method comprising the steps of:
   (a) determining if a critical line is to be printed;
   (b) determining if the shaded color is to be printed;
   (c) if a shaded pattern (any pattern but a critical line) is to be printed utilizing one of said predetermined colors, generating a print buffer in accordance with a first algorithm;
   (d) if a critical line having the shaded color is to be printed, generating a print buffer in accordance with a second algorithm; and
   (e) otherwise, generating a print buffer using the designated color.

2. A method of generating shaded colors according to claim 1, wherein said first algorithm comprises the steps of:
   (a) summing the row number and column number of the pixel which is being generated for the print buffer;
   (b) if the resulting sum of step (a) is even, setting the pixel to the preselected color; and
   (c) if the resulting sum of step (a) is odd, setting the pixel to the black color.

3. A method of generating shaded colors according to claim 1, wherein said second algorithm comprises the steps of:
   (a) setting the even numbered column pixels to the preselected color; and
   (b) setting the odd numbered column pixels to the black color.

4. A method of generating shaded colors according to claim 2, wherein said second algorithm comprises the steps of:
   (a) setting the even numbered column pixels to the preselected color; and
   (b) setting the odd numbered column pixels to the black color.

5. In a low resolution color printer which prints a pattern by printing selected pixels, said printer having a predetermined number of primary colors and wherein said printer supports the printing of secondary colors by overstriking a predetermined combination of said primary colors, said primary and secondary colors making up a color set of said printer, said printer also having a color black, a method of generating shaded primary and shaded secondary colors thereby expanding the color set of said printer, said method comprising the steps of:
   (a) determining if a critical line is to be printed;
   (b) determining if the shaded color is to be printed;
   (c) if a shaded pattern (any pattern but a critical line) is to be printed utilizing one of said primary or secondary colors, generating a print buffer in accordance with a first algorithm;

(d) if a critical line having a shaded primary or secondary color is to be printed, generating a print buffer in accordance with a second algorithm; and (e) otherwise, generating a print buffer using the designated primary or secondary color.

6. A method of generating shaded colors according to claim 5, wherein said first algorithm comprises the steps of:

(a) summing the row number and column number of the pixel which is being generated for the print buffer;

(b) if the resulting sum of step (a) is even, setting the pixel to the preselected primary or secondary color; and (c) if the resulting sum of step (a) is odd, setting the pixel to the black color.

7. A method of generating shaded colors according to claim 5, wherein the second algorithm comprises the steps of:

(a) setting the even numbered column pixels to the preselected primary or secondary color; and (b) setting the odd numbered column pixels to the black color.

8. A method of generating shaded colors according to claim 6, wherein said second algorithm comprises the steps of:

(a) setting the even numbered column pixels to the preselected primary or secondary color; and (b) setting the odd numbered column pixels to the black color.

9. A method of generating shaded colors according to claim 5, wherein said second algorithm comprises the step of:

causing pixels utilized to generate the critical line to alternate between the black color and the primary or secondary color.

10. A method of generating shaded colors according to claim 6, wherein said second algorithm comprises the step of:

causing pixels utilized to generate the critical line to alternate between the black color and the primary or secondary color.

11. In a low resolution color printer which prints a pattern by printing selected pixels, said printer having a predetermined number of colors thereby making a color set of said printer, and wherein a dark color (quasi-black color) is generated by overstriking predetermined colors of said printer, a method of generating shaded colors thereby expanding the color set of said printer, said method comprising the steps of:

(a) determining if a critical line is to be printed;

(b) determining if the shaded color is to be printed;

(c) if a shaded pattern (any pattern but a critical line) is to be printed utilizing one of said predetermined colors, generating a print buffer in accordance with a first algorithm;

(d) if a critical line having the shaded color is to be printed, generating a print buffer in accordance with a second algorithm; and (e) otherwise, generating a print buffer using the designated color.

12. A method of generating shaded colors according to claim 11, wherein said first algorithm comprises the steps of:

(a) summing the row number and column number of the pixel which is being generated for the print buffer;

(b) if the resulting sum of step (a) is even, setting the pixel to the preselected color; and (c) if the resulting sum of step (a) is odd, setting the pixel to print the dark color.

13. A method of generating shaded colors according to claim 11, wherein said second algorithm comprises the steps of:

(a) setting the even numbered column pixels to the preselected color; and (b) setting the odd numbered column pixels to print the dark color.

14. A method of generating shaded colors according to claim 12, wherein said second algorithm comprises the steps of:

(a) setting the even numbered column pixels to print the preselected color; and (b) setting the odd numbered column pixel to print the dark color.

15. In a low resolution color printer which prints a pattern by printing selected pixels, said printer having a predetermined number of primary colors thereby making a color set of said printer, a method of generating secondary colors thereby expanding the color set of said printer, said method comprising the steps of:

(a) determining if a critical line is to be printed;

(b) determining if the secondary color is to be (c) if a pattern of a secondary color is to be printed, wherein the pattern to be printed is not a critical line, generating a print buffer in accordance with a first algorithm;

(d) if a critical line having a secondary color is to be printed, generating a print buffer in accordance with a second algorithm; and (e) otherwise, generating a print buffer of the designated primary color.

16. A method of generating a secondary color according to claim 15, wherein said first algorithm comprises the steps of:

(a) summing the row number and column number of the pixel which is being generated for the print buffer;

(b) if the resulting sum of step (a) is even, setting the pixel to a first primary color; and (c) if the resulting sum of step (a) is odd, setting the pixel to a second primary color, the juxtaposing of said first and second primary colors generating a secondary color.

17. A method of generating secondary colors according to claim 15, wherein the second algorithm comprises the steps of:

(a) setting the even numbered column pixel to a first primary color; and (b) setting the odd numbered column pixel to a second primary color.

18. A method of generating secondary colors according to claim 16, wherein the second algorithm comprises the steps of:

(a) setting the even numbered column pixels to a first primary color; and (b) setting the odd numbered column pixel to a second primary color.

* * * * *

UNITED STATES PATENT AND TRADEMARK OFFICE
CERTIFICATE OF CORRECTION

PATENT NO. : 4,894,665
DATED : January 16, 1990
INVENTOR(S) : Randall L. Davis It is certified that error appears in the above—identified patent and that said Letters Patent is hereby corrected as shown below:

On drawing sheets 1 through 6, delete "4,864,665" and insert therefor --4,894,665--.

Signed and Sealed this

Nineteenth Day of March, 1991

*Attest:*

HARRY F. MANBECK, JR.

*Attesting Officer*　　　　　*Commissioner of Patents and Trademarks*